(12) United States Patent
Alchemy et al.

(10) Patent No.: US 12,002,013 B2
(45) Date of Patent: Jun. 4, 2024

(54) METHOD OF AND SYSTEM FOR PARITY REPAIR FOR FUNCTIONAL LIMITATION DETERMINATION AND INJURY PROFILE REPORTS IN WORKER'S COMPENSATION CASES

(71) Applicant: Alchemy Logic Systems, Inc., Santa Rosa, CA (US)

(72) Inventors: John William Alchemy, Santa Rosa, CA (US); Jerry Lee Artz, St. Paul, MN (US); Bruce Brandon Wilson, Woodbury, MN (US)

(73) Assignee: Alchemy Logic Systems, Inc., Santa Rosa, CA (US)

( * ) Notice: Subject to any disclaimer, the term of this patent is extended or adjusted under 35 U.S.C. 154(b) by 0 days.

(21) Appl. No.: 18/112,819

(22) Filed: Feb. 22, 2023

(65) Prior Publication Data
US 2023/0196297 A1    Jun. 22, 2023

Related U.S. Application Data

(63) Continuation of application No. 16/653,508, filed on Oct. 15, 2019, now Pat. No. 11,625,687.

(60) Provisional application No. 62/746,206, filed on Oct. 16, 2018.

(51) Int. Cl.
G06Q 10/1053 (2023.01)
G06F 11/10 (2006.01)

(52) U.S. Cl.
CPC ..... *G06Q 10/1053* (2013.01); *G06F 11/1032* (2013.01); *G06F 11/1076* (2013.01)

(58) Field of Classification Search
CPC ............. G06Q 10/1053; G06F 11/1032; G06F 11/1076
See application file for complete search history.

(56) References Cited

U.S. PATENT DOCUMENTS 4,916,611 A   4/1990   Doyle, Jr. et al.
4,987,538 A   1/1991   Johnson et al.
(Continued)

FOREIGN PATENT DOCUMENTS

CA   2707207 A1   6/2009
WO   2008006117 A2   1/2008
WO   20182249317 A1   12/2018

OTHER PUBLICATIONS

Häkkinen, Arja, et al. "Muscle strength, pain, and disease activity explain individual subdimensions of the Health Assessment Questionnaire disability index, especially in women with rheumatoid arthritis." Annals of the rheumatic diseases 65.1 (2006): 30-34. (Year: 2006).*

(Continued)

*Primary Examiner* — Laura Yesildag
*Assistant Examiner* — Corey Russ
(74) *Attorney, Agent, or Firm* — Haverstock & Owens, A Law Corporation

(57) ABSTRACT

A method and system for quantifying a lack of parity for a subjective data set and an objective data set within an injury profile report. The method and system analyzes and inspects each subjective and objective data set and compares these data sets to a historical accuracy database to find a lack of agreement or non-parity of the data sets. The method and system quantifies the lack of parity, creates an injury profile report and proscribes any functional limitations for the injured worker. The output can be used to assign safer and more accurate functional limitations and assign safer and mor accurate functional limitations to support a safer return to work event for the inured worker after injury.

17 Claims, 3 Drawing Sheets

(56) References Cited

U.S. PATENT DOCUMENTS

| | | | |
|---|---|---|---|
| 5,182,705 A | 1/1993 | Barr et al. | |
| 5,367,675 A | 11/1994 | Cheng et al. | |
| 5,517,405 A | 5/1996 | McAndrew et al. | |
| 5,544,044 A | 8/1996 | Leatherman | |
| 5,613,072 A | 3/1997 | Hammond et al. | |
| 5,778,345 A | 7/1998 | McCartney | |
| 5,911,132 A | 6/1999 | Soane | |
| 6,003,007 A | 12/1999 | DiRienzo | |
| 6,065,000 A | 5/2000 | Jensen | |
| 6,604,080 B1 | 8/2003 | Kern | |
| 6,810,391 B1 | 10/2004 | Birkhoelzer et al. | |
| 6,865,581 B1* | 3/2005 | Cloninger, Jr. | G06Q 10/06398 705/7.42 |
| 6,954,730 B2 | 10/2005 | Lau et al. | |
| 6,957,227 B2 | 10/2005 | Fogel | |
| 7,331,721 B2 | 2/2008 | Beinat | |
| 7,401,056 B2 | 7/2008 | Kam | |
| 7,440,904 B2 | 10/2008 | Hasan et al. | |
| 7,475,020 B2 | 1/2009 | Hasan et al. | |
| 7,509,264 B2 | 3/2009 | Hasan et al. | |
| 7,630,911 B2 | 12/2009 | Kay | |
| 7,630,913 B2 | 12/2009 | Kay | |
| 7,707,046 B2 | 4/2010 | Kay | |
| 7,707,047 B2 | 4/2010 | Hasan et al. | |
| 7,778,849 B1 | 8/2010 | Hutton | |
| 7,813,944 B1 | 10/2010 | Luk | |
| 7,870,011 B2 | 1/2011 | Kay | |
| 7,904,309 B2 | 3/2011 | Malone | |
| 7,930,190 B1 | 4/2011 | Millanovich | |
| 7,949,550 B2 | 5/2011 | Kay | |
| 7,970,865 B2 | 6/2011 | DeCesare et al. | |
| 8,019,624 B2 | 9/2011 | Malone | |
| 8,041,585 B1 | 10/2011 | Binns et al. | |
| 8,065,163 B2 | 11/2011 | Morita et al. | |
| 8,069,066 B2 | 11/2011 | Stevens et al. | |
| 8,185,410 B2 | 5/2012 | Brigham | |
| 8,301,575 B2 | 10/2012 | Bonnet et al. | |
| 8,346,573 B2 | 1/2013 | Glimp et al. | |
| 8,425,524 B2 | 4/2013 | Aker et al. | |
| 8,489,413 B1 | 7/2013 | Larson et al. | |
| 8,489,424 B2 | 7/2013 | Hasan et al. | |
| 8,510,134 B1 | 8/2013 | Sweat | |
| 8,527,303 B2 | 9/2013 | Kay | |
| 8,615,409 B1 | 12/2013 | McKown | |
| 8,630,878 B1 | 1/2014 | Kravets et al. | |
| 8,725,538 B2 | 5/2014 | Kay | |
| 8,751,252 B2 | 6/2014 | Chamberlain | |
| 8,751,263 B1 | 6/2014 | Cave et al. | |
| 8,751,266 B2 | 6/2014 | Stang | |
| 8,775,216 B1 | 7/2014 | Amick et al. | |
| 8,864,663 B1 | 10/2014 | Kahn et al. | |
| 8,868,768 B2 | 10/2014 | Sokoryansky | |
| 8,888,697 B2 | 11/2014 | Bowman et al. | |
| 8,900,141 B2 | 12/2014 | Smith et al. | |
| 8,910,278 B2 | 12/2014 | Daune et al. | |
| 8,930,225 B2 | 1/2015 | Morris | |
| 8,959,027 B2 | 1/2015 | Kusens | |
| 8,954,339 B2 | 2/2015 | Schaffer | |
| 9,002,719 B2 | 4/2015 | Tofte | |
| 9,015,055 B2 | 4/2015 | Tirinato et al. | |
| 9,020,828 B2 | 4/2015 | Heidenreich | |
| 9,031,583 B2 | 5/2015 | Pereira | |
| 9,229,917 B2 | 1/2016 | Larcheveque | |
| 9,710,600 B1 | 7/2017 | Dunleavy | |
| 2001/0027331 A1 | 10/2001 | Thompson | |
| 2001/0044735 A1 | 11/2001 | Colburn | |
| 2001/0053984 A1* | 12/2001 | Joyce | G16H 20/10 705/2 |
| 2002/0069089 A1* | 6/2002 | Larkin | G16H 40/20 705/4 |
| 2002/0077849 A1 | 6/2002 | Baruch | |
| 2004/0044546 A1 | 3/2004 | Moore | |
| 2005/0060184 A1 | 3/2005 | Wahlbin | |
| 2005/0177403 A1* | 8/2005 | Johnson | G06Q 20/201 705/20 |
| 2005/0256744 A1 | 11/2005 | Rohde | |
| 2006/0161456 A1 | 7/2006 | Baker | |
| 2006/0287879 A1 | 12/2006 | Malone | |
| 2007/0118406 A1 | 5/2007 | Killin | |
| 2007/0250352 A1 | 10/2007 | Tawil | |
| 2008/0046297 A1 | 2/2008 | Shafer | |
| 2008/0133297 A1 | 6/2008 | Schmotzer | |
| 2008/0154672 A1 | 6/2008 | Skedsvold | |
| 2008/0183497 A1 | 7/2008 | Soon-Shiong | |
| 2009/0099875 A1 | 4/2009 | Koenig | |
| 2010/0042435 A1 | 2/2010 | Kay | |
| 2010/0106520 A1 | 4/2010 | Kay | |
| 2010/0106526 A1 | 4/2010 | Kay | |
| 2010/0114609 A1 | 5/2010 | Duffy, Jr. | |
| 2010/0217624 A1 | 8/2010 | Kay | |
| 2010/0240963 A1 | 9/2010 | Brighman | |
| 2011/0077980 A1 | 3/2011 | Kay | |
| 2011/0077981 A1 | 3/2011 | Kay | |
| 2011/0161115 A1 | 6/2011 | Hampton | |
| 2011/0257919 A1 | 10/2011 | Reiner | |
| 2011/0257993 A1 | 10/2011 | Shahani | |
| 2011/0313785 A1 | 12/2011 | Lash | |
| 2011/0313912 A1 | 12/2011 | Teutsch | |
| 2012/0102026 A1 | 4/2012 | Fortune | |
| 2012/0130751 A1* | 5/2012 | McHugh | G06Q 40/08 705/500 |
| 2012/0232924 A1 | 9/2012 | Bingham | |
| 2012/0245973 A1* | 9/2012 | Pandya | G06Q 10/1097 705/7.28 |
| 2012/0278095 A1 | 11/2012 | Homchowhury | |
| 2012/0280931 A1 | 11/2012 | Stephanick | |
| 2012/0284052 A1* | 11/2012 | Saukas | G06Q 10/00 705/3 |
| 2013/0024214 A1 | 1/2013 | Shoen | |
| 2013/0132122 A1* | 5/2013 | Walsh | G06Q 40/08 705/4 |
| 2014/0058763 A1* | 2/2014 | Zizzamia | G06Q 10/10 705/4 |
| 2014/0073486 A1 | 3/2014 | Ahmed | |
| 2014/0136216 A1 | 5/2014 | Beebe | |
| 2014/0172439 A1 | 6/2014 | Conway | |
| 2014/0201213 A1 | 7/2014 | Jackson | |
| 2014/0249850 A1 | 9/2014 | Woodson | |
| 2014/0278479 A1 | 9/2014 | Wang | |
| 2014/0278830 A1* | 9/2014 | Gagne | G16H 20/30 705/7.42 |
| 2014/0303993 A1 | 10/2014 | Florian | |
| 2014/0379364 A1 | 12/2014 | Liu et al. | |
| 2015/0019234 A1 | 1/2015 | Cooper | |
| 2015/0221057 A1 | 8/2015 | Raheja | |
| 2015/0235334 A1 | 8/2015 | Wang | |
| 2015/0242585 A1 | 8/2015 | Spiegel | |
| 2015/0278462 A1 | 10/2015 | Smoley | |
| 2015/0286792 A1 | 10/2015 | Gardner | |
| 2015/0324523 A1 | 11/2015 | Parthasarathy | |
| 2016/0063197 A1 | 3/2016 | Kumetz | |
| 2016/0259499 A1 | 9/2016 | Kocienda | |
| 2016/0283676 A1 | 9/2016 | Lyon | |
| 2016/0292571 A1 | 10/2016 | Alhimin | |
| 2017/0140489 A1* | 5/2017 | Ziobro | G16H 10/60 |
| 2017/0177810 A1* | 6/2017 | Fulton | G16H 50/20 |
| 2017/0228517 A1 | 8/2017 | Saliman | |
| 2017/0255754 A1* | 9/2017 | Allen | G06Q 40/08 |
| 2017/0316424 A1 | 11/2017 | Messana | |
| 2018/0025334 A1 | 1/2018 | Pourfallah | |
| 2019/0065686 A1 | 2/2019 | Crane | |
| 2020/0126645 A1 | 4/2020 | Robbins | |
| 2020/0279622 A1* | 9/2020 | Heywood | G16H 15/00 |
| 2020/0286600 A1 | 9/2020 | DeBrouwer | |

OTHER PUBLICATIONS

"CA DWC Releases 4th Edition of Physician's Guide to Medical Practice in CA WC", Apr. 5, 2016, workcompwire.com, 7 pages.

Hakkinen, Arja, et al. "Muscle strength, pain, and disease activity explain individual subdimensions of the Health Assessment Questionaire disability index, especially in women with rheumatoid arthritis". Annals of the rheumatic diseases 65.1 (2006): 30-34. (Year: 2006).

In B. Pffafenberger, Webster's new World & Trade; Computer Dictionary (10th ed). Houghton Mifflin Harcourt, Credo reference:https://search.credorreference.com/content/entry/webster.com/database (year 2003).

American College of Occupational and Environmental Medicine, Occupational Medicine Practice Guidelines, 2004, Second Edition, OEM Press, Beverly Farms, MA.

CA Medical Treatment Utilization Schedule, Proposed Chronic Pain Medical Treatment Guidelines, Jun. 2008, 83 pages.

Park, Y., & Butler, R. J. (2000). Permanent Partial Disability Awards and Wage Loss, Journal of Risk and Insurance, 67(3), 331, retrieved from https://dialog.proquest.com/professional/docview/769439682?accountid=142257 (Year: 2000).

"Physicians Guide to Medical Practice in the California Worker's Compensation System", 2016, State of California Department of Industrial Relations Division of Worker's Compensation, 4th ed., all pages . (Year 2016).

State of California Department of Industrial Relations Division of Workers Compensation, Physicians Guide to Medical Practice in the California Workers Compensation System, Fourth Edition, 2016, 137 pages.

Cocchiarella, Linda and Andersson, Gunnar B.J., Guides to the Evaluation of Permanent Impairment, 2001, Fifth Edition, American Medical Association, 618 pages.

Rondinelli, Robert D., Guides to the Evaluation of Permanent Impairment, 2008 Sixth Edition, American Medical Association.

"Programming Languages" from Berkshire Encyclopedio of Human-Computer Interaction, Credo Reference, 5 pages.

Ammendolia C. Cassidy D., Steensta I, et al. Designing a Workplace Return-to Work Program for Occupational Low Back Pain: an intervention mapping approach. BMC Musculoskelet Disord. 2009;10:65. Published Jun. 9, 2009. doi: 10.1186/1471-2474-10-65 (Year; 2009). 10 pages.

Wasiak, Radoslaw, et al. "Measuring Return to Work." Journal of Occupational Rehabilitation 17.4 (2007): 766-781. (Year: 2007). 16 pages.

* cited by examiner

US 12,002,013 B2

METHOD OF AND SYSTEM FOR PARITY REPAIR FOR FUNCTIONAL LIMITATION DETERMINATION AND INJURY PROFILE REPORTS IN WORKER'S COMPENSATION CASES

RELATED APPLICATIONS

This Patent Application is a continuation of U.S. non-provisional application Ser. No. 16/653,508, filed on Oct. 15, 2019, and entitled "METHOD OF AND SYSTEM FOR PARITY REPAIR FOR FUNCTIONAL LIMITATION DETERMINATION AND INJURY PROFILE REPORTS IN WORKER'S COMPENSATION CASES," which claims priority under 35 U.S.C. 119(e) of the co-pending U.S. provisional patent application, Serial No. 62/746,206, filed on Oct. 16, 2018, and entitled "PARITY REPAIR FOR FUNCTIONAL LIMITATION DETERMINATION AND INJURY PROFILE REPORT IN WORKER COMPENSATION," which are all hereby incorporated in their entirety by reference.

FIELD OF THE INVENTION

The present invention is generally directed to telemedicine. More specifically, the present invention is directed to a method and system for addressing the inconsistency and intra-provider variability in the delivery of functional limitation notification to stakeholders enabling claim closure in worker's compensation claim cases.

BACKGROUND OF THE INVENTION

In the field of worker's compensation medical practice, the clinical evaluation of the injury amount, type and severity is important to worker's compensation claim closure. Stakeholders are aware that the clinical evaluation impacts the resulting processes, therapies, employer status, insurance coverage, claim cost and other factors. Thus, worker's compensation claim progression is highly dependent on the confidence of the stakeholders in the clinical evaluation. Factors of the evaluation that do not show agreement are quickly noticed and can be challenged by the one or more stakeholders which can lead to litigation or other delays, which halt claim progression.

SUMMARY OF THE INVENTION

The present invention is directed to a method and system for quantifying a lack of parity for a subjective data set and an objective data set within an injury profile report. The presently claimed invention analyzes and inspects each subjective and objective data set and compares these data sets to a historical accuracy database to find a lack of agreement or non-parity of the data sets. The method and system quantifies the lack of parity, creates an injury profile report and proscribes any functional limitations for the injured worker. The output can be used to assign safer and more accurate functional limitations and assign safer and mor accurate functional limitations to support a safer return to work event for the inured worker after injury.

In one aspect, a method of quantifying a lack of parity for a subjective data set and an objective data set within an injury profile report comprises inputting a subjective data set for an injured worker, inputting an objective data set for the injured worker, analyzing the subjective data set and the objective data set to determine one or more data gaps, repairing the subjective data set and the objective data set and comparing a repaired subjective data set to a repaired objected data set to quantify a parity for the subjective data set and the objective data set. In some embodiments, the subjective data set and the objective data set are repaired by comparison to a historical accuracy database. In some embodiments, the parity for the subjective and objective data sets is compared against historical parity for similar subjective and objective data sets for the injury. In further embodiments, if the parity is below a threshold value, the subjective and objective data is further repaired according to the historical accuracy database. Alternatively, in some embodiments, if the parity is above the threshold value an injury profile report including functional return to work limitations are created. In some embodiments, analyzing the subjective and objective data sets comprises assessing the source of the lack of non-parity of the data sets.

In further embodiments, a system for quantifying a lack of parity for a subjective data set and an objective data set within an injury profile report comprises a subjective data set input for receiving a subjective data set, an objective data set input for receiving an objective data set and a high accuracy database, wherein based on the subjective data set input and the objective data set input, the high accuracy database outputs a parity analysis for the subjective data set and the objective data set. In some embodiments, the parity for the subjective and objective data sets is compared against historical parity for similar subjective and objective data sets for the injury. In some embodiments, if the parity is below a threshold value, the subjective and objective data is further repaired according to a historical accuracy database. Alternatively, in some embodiments, if the parity is above the threshold value an injury profile report including functional return to work limitations are created. In some embodiments, the subjective and objective data sets are analyzed to assess a source of the lack of non-parity of the data sets.

In another embodiment, a system for system for quantifying a lack of parity for a subjective data set and an objective data set within an injury profile report comprises a computing device configured for inputting one or more subjective data sets and one or more objective data sets, a high accuracy database for receiving the one or more subjective data sets and the one or more objective data sets and a processor within the high accuracy database for analyzing the one or more subjective data sets and the one or more objective data sets, wherein based on the subjective data set and the objective data set, the high accuracy database outputs a parity analysis for the subjective data set and the objective data set. In some embodiments, the parity for the subjective and objective data sets is compared against historical parity for similar subjective and objective data sets for the injury. In some embodiments, if the parity is below a threshold value, the subjective and objective data is further repaired according to a historical accuracy database. Alternatively, in some embodiments, if the parity is above the threshold value an injury profile report including functional return to work limitations are created. In some embodiments, the subjective and objective data sets are analyzed to assess a source of the lack of non-parity of the data sets.

DETAILED DESCRIPTION OF THE EMBODIMENTS

Figure 1:
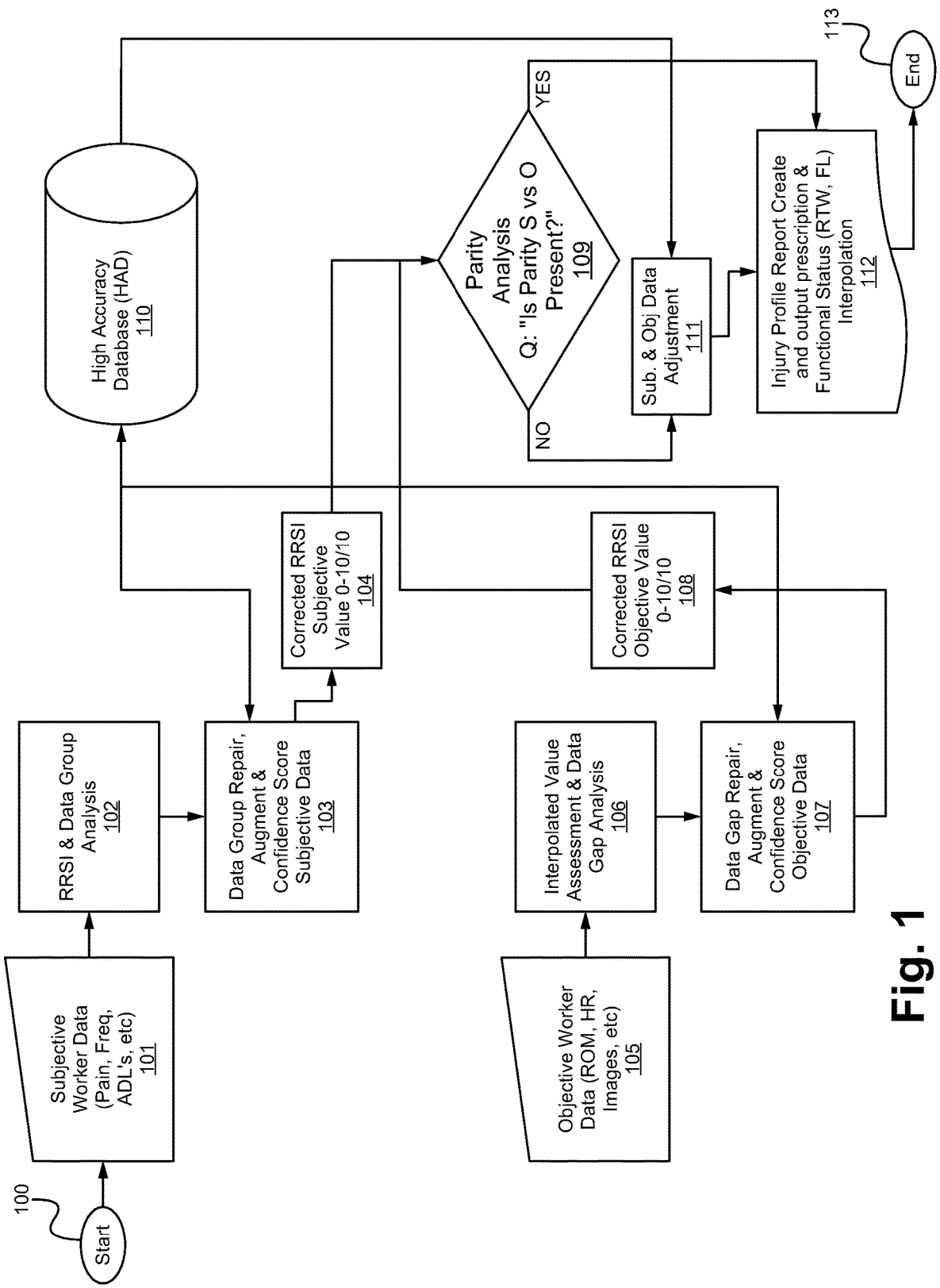
FIG. 1 illustrates a method of quantifying a lack of parity for a subjective data set and an objective data set within an injury profile report in accordance with some embodiments.

Embodiments of the invention are directed to a method and system for quantifying a lack of parity for a subjective data set and an objective data set within an injury profile report. The presently claimed invention analyzes and inspects each subjective and objective data set and compares these data sets to a historical accuracy database to find a lack of agreement or non-parity of the data sets. The method and system quantify the lack of parity, create an injury profile report and proscribe any functional limitations for the injured worker. The output can be used to assign safer and more accurate functional limitations and assign safer and more accurate functional limitations to support a safer return to work event for the inured worker after injury.

Reference will now be made in detail to implementations of a method of and system for parity repair for functional limitation determination and injury profile reports in worker's compensation cases. The same reference indicators will be used throughout the drawings and the following detailed description to refer to the same or like parts. In the interest of clarity, not all of the routine features of the implementations described herein are shown and described. It will be appreciated that in the development of any such actual implementation, numerous implementation-specific decisions can be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

A frequently encountered disparity in a medical evaluation can be the differences that arise from the objective versus the subjective portions of the medical exam. The objective portions of the exam can comprise data such as range of motion (ROM), x-rays, magnetic resonance imaging (MRIs) and other such objective data measurements. The subjective portions of the medical exam can comprise data including, pain levels, strength, endurance, tolerance, stability and other such subjective data measurements. Each of these data sets contributed toward a total assessment of a patient's condition. Where there is a non-agreement between the assessments from the objective data sets and the subjective data sets this is referred to as a lack of parity within the medical exam.

It is not possible for a person using manual techniques such as pen and paper to compile the information from these data sets from all similar injuries within a meaningful time frame. Indeed, it is likely not possible for a person to accomplish such a task within a full career.

An immediate and common need from the medical examination is the ability of the injured worker to safely return to work. Also, if the injured worker does return to work, what sorts of limitations are placed on the injured worker's work responsibilities. In many states, the return to work (RTW) and functional limitations are formal parts of the worker's compensation process. The presently claimed invention can create an injury profile report which outputs and summarizes the worker's return to work and functional limitations.

Particularly, as described herein, the presently claimed invention applies one or more proprietary methodologies and systems to input data gathered to the best intentions and capabilities of the interested stakeholders. Alternative inappropriate data generations methods are described in the U.S. patent application Ser. No. 16/124,960 to Alchemy et al. (the '960 Application), which is hereby incorporated by reference in its entirety.

During clinical evaluation, judgement, experience, training and skill are necessary to determine an accurate analysis of present injury(ies) and also the implications of those injuries. These characteristics, judgement, experience, training and skill had been referred to as the four corners of medical evaluations. [See, e.g.,Worker's Compensation Board, State of California, "Almaraz, Case #ADJ1078163", "Guzman, Case #ADJ3341185", Feb. 3, 2008, case summary and ruling, incorporated by reference herein.] A discussion of the development and the application of the four corners rule is also discussed further in the administrative rule set (ARS) definition and development of U.S. patent application Ser. No. 16/124,960 to Alchemy et al. (the '960 Application), which is hereby incorporated by reference in its entirety.

Currently, the American Medical Association (AMA) guides do not measure work impairment. Rather, the AMA guides provide an estimate of the impact of an injury or condition on an injured worker's ability to preform activities of daily living (ADLs), excluding work. The AMA guide recognizes that the guide is merely a first step for measuring work impairment. Therefore, factors outside the AMA guide can be considered, including the impact of the injury on an employee's ability to perform work activites. The AMA guides discuss whole person impairment and the elements of each body part according to specific injuries and pathologies of the injury.

The parity calculator as discussed herein, analyzes the objective and subjective portions of the medical evaluation for the purposes of assessing the validity of the final impairment rating. The parity calculator can also identify the sources of the non-agreement between the subjective and the objective portions of the exam data and final summary. Use of one or more ARSs for the impairment data can then interpolate a final whole person impairment rating (WPI) that may or may not appear as an averaging of the objective and subjective portions of the evaluation.

In some embodiments, after the WPI is calculated it can be used to further analyze the injur(ies) of the worker using one or more work ARSs for creating the functional limitations for the defined and/or anticipated work function of the injured worker. The ARSs can consider the type of work that is being performed and the physical elements of the work to guide the clinical evaluations for the worker.

Assigning the functional limitations in the worker's compensation claim process is a primary function that affects all of the stakeholders. Each medical visit requires the injured worker to have a functional status to be determined to provide guidance that is used for return to work consideration. At the doctor's first report, an initial assessment must be conducted by the medical provider and documentation prepared to be provided to the employer and the insurance carrier. Based on these findings, the employer can determine if reasonable accommodations can be made to allow the injured worker to return to work. Similarly, the functional limitations are used by the insurance carrier to determine if the injured worker is eligible for compensation benefits and also what dates the eligibility exists and/or existed.

An incorrect assignment of functional limitations can be a source of contention and frustration in the worker's compensation system due to a complexity interpreting subjective complaints, reports of activities of daily living (ADLs), objective physical findings and diagnostic test results. Incorrect assignment of functional limitations can result in stakeholder conflict, delay in return to work, increased cost of claim management and litigation. The process of functional limitation by the medical provider can be a highly subjective and varied output of the worker's compensation system. Additionally, a lack of an agreed upon administrative rule set (ARS) to govern the process may make the assignment of a functional limitation even more difficult.

A viable option is to use a multi-dimensional data analysis to evaluate the conditions injured worker at a single visit or point in time using a weighted algorithm to compare the injured worker's subjective complaints, objective physical findings and diagnostic tests. Using this approach, a substantially improved and validating system for the delivery of functional limitations of an injured worker to the stakeholders is possible enabling the worker's compensation claim to move forward.

The administrative rule sets as discussed herein are described within U.S. patent application Ser. No. 14/996,067 (the '067 Application), which is incorporated by reference herein.

Experience has shown that the common need for such a tool is not only useful, but that there is a considerable ambiguity as to how to obtain parity when determining functional limitations, the source of non-parity and how to reconcile the meaning of a non-agreement with the data. A source of ambiguity can be due to numerous factors and the types of data depend on the type of injur(ies) present. Further, assessing the priorities in factoring or weighing the importance each part of the data set can result is a lack of conformity of evaluations between doctors and clinics. This invention develops and applies unique administrative rule sets that provide a consistent structure to the evaluation of data yielding sufficient parity to obtain a functional limitation evaluation and a possible return to work allowance.

One problem can be an incorrect functional limitation assignment. This can be due to a lack of correct data or completeness of the data. Additionally, generalized averages of existing work limitations can be based on "dirty" data that is not validated or systematically weighed against an accepted standard.

The present invention can identify a lack of medical provider confidence in assessing a correct and object basis of determination and correct for output of an incorrect and contestable functional limitation for the stakeholders. The solution is a significantly improved system that can mitigate or remove the subjective bias of the medical provider. Additionally, the presently claimed invention can provide an objective basis for functional limitations and is reproducible across the worker's compensation system and bounded by universal conditions across claims, cases and medical providers.

Subjective pain and/or symptoms report for an injured worker can be determined by an analogue pain value 0-10 system. Activities of daily living can be determined by the administrative rule set as applied. Additionally clinical physical exam findings can include:

1. Vital Signs
   a. blood pressure;
   b. heart rate;
   c. respiratory rate;
   d. weight/height (BMI)
   e. oxygen saturation values
2. Inspection
   a. posture
   b. grimacing
   c. splinting or extremity guarding
3. Palpation
   a. tenderness
   b. spasm
   c. guarding
4. Range of Motion
   a. restricted
   b. full
5. Neuromotor Testing
   a. sensory/dermatomal
   b. strength testing
   c. reflexes
6. Diagnostic Testing
   a. x-ray
   b. advance imaging
   c. electromyographic and nerve conduction velocity (EMG/NCS)
   d. laboratory tests including: chemistry and pathology specimens To provide functional limitation recommendations, a recovery score index (RSI) can be used to weigh an average result across all dimensions of a general work requirement using a standardized functional task survey such as the California RU-91 format and deliver a work status based on the unique conditions of the worker. The rate fast RSI is described in U.S. patent application Ser. No. 16/351,299 (the '299 Application), which is incorporated by reference herein. The method and system such as described within the presently claimed invention provides standardized results across multiple evaluators and removes validity and subjectivity bias.

Additionally, the presently claimed invention enables stakeholders to utilize a predictable and reproducible system that can determine functional limitations at the onset of an injury assessment. The presently claimed invention can implement an objective rule set application to prescribed data types, provide a transparent assessment of data agreement and parity, assess a comparison based on historical factors commonly encountered and based on a resultant scalar determination.

As such, the presently claimed invention reduces conflict, delay in claim progression, litigation, provider institutional bias and subjectivity. Consequently, distribution of benefits can be timely and the risk of an aggravation of the condition at work can be mitigated. This increases and accelerates accuracy and consistency in the assignment of functional limitations during the worker's compensation process. Additionally, the presently claimed method and system promotes an acceptance of the functional limitations among the stakeholders and trend and map the recovery process. This also reduces cost to the stakeholders and society within a system that is inherent with high error rates and has a wide variance of intra-provider outcomes.

The method and system as described herein anticipates a more common work injury set that is orthopedic in nature. Respiratory problems from vapor or gas exposure, dermal and neural problems from thermal event exposure can add or exchange additional factors in the clinic evaluation. Particularly, there can be a myriad of injury types resulting from multiple sources. The method and system as described herein describes how to sort these problems in a consistent and accurate basis.

As described above, the method and system guides the analysis, applies an in depth inspection of each data set and performs an additional comparison to a high accuracy database to assess a source of a lack of agreement or non-parity. The method and system is then able to quantify the lack of parity to provide an injury profile report including one or more functional limitations for the injured worker. This data can then be used to assign a safer and more accurate functional limitation prescription for a safer return to work event after injury.

Some examples are shown below. These examples are in no way meant to limit the scope of the invention but rather illustrates some specific situations to exhibit the present invention. The method and system as described herein is applicable to any appropriate scenario such as attributed to a worker's compensation claim.

The examples that follow are in no way meant to limit the scope of the invention. They are merely to illustrate some specific anecdotes to exhibit the utility of this invention. A myriad of applicable scenarios are envisioned, as many as there are stalled claims.

EXAMPLE 1

A 45 year old male warehouse worker injures his low back lifting a box. His usual work is repeated lifting of up to 75 pounds, eight hours per day. He is evaluated by an employer sponsored medical network and at the doctor's first report (DFR) he complains of 8/10 pain, 6/34 ADLs impacted and his physical exam is moderately abnormal. An office x-ray demonstrates L4-5 moderate severe arthritis and a grade 1 spondylolisthesis (vertebral subluxation). The medical provider returns the worker to full duty. Consequently, the next day the worker leaves work early due to worsening pain exacerbated by continued heavy lifting. He is again told to return to regular work by the doctor. The worker is unhappy with the functional limitation management and hires a lawyer. His care is transferred to an applicant attorney doctor that places him on total temporary disability. The employer now must hire a second employee to cover the work. The cost of the litigated claim now increases $25,000.

Example 1

Solution

The parity calculator is used at the DFR to determine that the injured workers exam was in parity, meaning the subjective complaints were consistent when weighted against the objective exam findings. In this scenario the worker was returned to work with recommendations based on the claim data of no lifting >15# and no bending at the waist >10 min per 30 minutes. Case management continued and case was settled at maximal medical improvement (MMI) without litigation in accordance with state labor codes.

Example 1

Conclusion

Previously, stakeholders have not had access to a solution capable of objective results when comparing injury symptoms to physical exam findings, signs and diagnostic testing. This invention solves the ambiguity of perceived symptoms and measurable loss on the physical exam and/or the severity of pathology found on testing. This removes a large barrier of contention that arises when a provider's "subjective experience" must be relied upon versus the functional limitations suggested by the data.

EXAMPLE 2

Further Injury and Impairment from an Index Injury

A 35-year-old female injures her left knee at work. Her pain is 7/10 and 15/34 ADLs are reported as limited. Objectively she has a limp and cannot fully flex (90d) or extend (15d) the knee. She is seen by the "company doctor" and diagnosed with a "strain". The doctor provides her a return to full duty functional prescription. She attempts to carry a 25*lb* box down the stairs and her knee gives way resulting in a fall. She has multiple additional injuries including a fractured wrist (dominant hand), torn shoulder rotator cuff, and a concussion resulting in a traumatic brain injury (TBI). Open reduction and internal fixation is required for the wrist, followed by a staged elective shoulder surgery. Psychometric testing shows permanent short-term cognitive loss. The knee is determined to have had a bucket handle tear and the compressed cartilage is macerated due to delayed diagnosis and results in 80% removal of the knee weight-bearing surface and orthopedic recommendation of a total knee replacement later in life. She hires a lawyer and the combined additional treatment for these body parts and litigation increases the claim costs by 15*x*. She brings a negligence lawsuit against her employer and the company clinic doctor.

Example 2

Solution

Previously, the process of determining functional work status recommendations was a highly subjective and variable medical "guesstimate". This process may also be influenced by institutional bias, which may minimize the injury significance and work recommendations to appear to be cost effective claim management regarding lost time.

Using a parity systematic approach to this claim, such as described herein, the claim could have determined that the subjective complaints placed this claim data set at moderate severity and the objective functional score as moderate demonstrating parity. The RSI value is interpolated across the RU-91 format with a return value of 6 and lifting limitation of 25#, weight bearing limited to 25 minutes per hour and no slopes, uneven terrain or ladders or stairs. The functional limitations are based on data unique to the patient's experience of the injury and the clinical exam.

Example 2

Conclusion

The employer now has more accurate and evidence based functional recommendations to meet a reasonable accommodation for the worker. This minimizes the risk of inappropriate or a high-risk work environment exposure while allowing appropriate work up of the index injury. In short, the parity functional limitation approach allows rapid risk mitigation for the stakeholders and true settlement cost containment with transparency.

Additional applications of the parity approach and a RSI, such as described, can include:
1. Calculating risk scores (credit scores) for:
   a. Doctors
   b. Employers
   c. Carriers
2. Creation of an injury score card including:
   a. Severity of injury
   b. Recovery percent
   c. Work status (based on parity)
   d. Apportionment
   e. Duration of time to MMI
   f. Real time settlement pricing (based on ghost impairment rating)
3. Social Security and Private Disability Benefit Policies (RSI and parity calc driven)
   a. An "identified or agreed examiner"
   b. Determine functional limitations for eligibility to policy or govt benefits
4. Functional status based on RSI (applications above)

The discussions of parity correction and the method to develop an injury profile report provide the background for the present invention. A refined analysis beginning with the four corners, such as described above and overlaid with one or more ARSs to provide guidance to a trained observer, or qualified medical examiner (QME), agreed medical examiner (AME), independent medical examiner (IME), physician and other stakeholders to yield an injury profile report. An analysis of work restrictions, return to work limitations and functional limitations are key outputs of the injury profile report.

The ARSs for calculating functional limitations are the unique application of a skilled experienced, well trained QME and judgment organized in a structured method and application applied to an initial clinical evaluation of an injured worker. As described below, the method and system of the presently claimed invention outputs an analysis based on one or more ARSs and functional limitations of the injured worker.

As described below, a high accuracy database (HAD) has two functions 1) augmenting one or more gaps within a parity calculation by matching the worker's compensation case with a RSI for a same body part. By augmenting the gaps within a parity calculation based on previous data collected by the HAD, the parity calculation receives full data for the worker's injur(ies). The HAD also 2) can be used as a historical reference to compare the RSI and the parity of similar cases and provide a percentile rank for the parity in the class. For example, an analysis of historical data within the HAD for a RSI match for a shoulder injury, shows an established trend of subjective and objective matching parity in 70% of cases. Thus, a comparison and analysis with a current case can determine whether there is parity within the current case or whether the case is an outlier. In this manner, the method and system described herein provides another test of confidence for a parity result.

Referring now to FIG. 1, a method of parity correction and developing an injury profile report is depicted therein. As described above, the injury profile report can be used to output and summarize a worker's return to work and functional limitations. As shown within FIG. 1, the method begins with an input of subjective patient data in the step 101 and patient objective data in the step 105. As described above, objective portions of the exam can comprise data such as ROM, x-rays, MRIs and other such objective data measurements. The subjective portions of the medical exam can comprise data including, pain levels, strength, endurance, tolerance, stability and other such subjective data measurements. Each of these data sets contributed toward a total assessment of a patient's condition.

Subjective and objective patient data can include for example, what level of pain is usual or ordinary and how are the concepts of frequency of pain and symptoms determined and applied. Additionally, how are the concepts of functional rate, pace and endurance represented by the data. The relative value of the exam findings and the deficits within the pathology for the injured worker can be defined by the ARSs for the injured worker. For example, an injured worker's shoulder has a ROM of 84% and a weakness of 60% with a relative relationship of 1.4:1. This can equal a relative understanding of a value of the physical exam findings in the context of assigning functional loss. For example, what does it mean if a patient has moderate loss of motion and severe motor loss with mild sensory loss. As described above, any absent or thin data is able to be analyzed within the HAD for a RSI match to augment the data and prediction. Validated data can also be compared to further augment the accuracy.

In the step 102, the subjective worker data is assigned a RSI and analyzed according to the data group for the injuries of the worker and the subjective worker data. Then, in the step 103 any subjective data gaps are able to be identified according to an analysis and a comparison based on previous data collected by the HAD and in the step 104, the subjective data gaps can be filled so that the data can be assigned a corrected or adjusted RSI.

Similarly, in the step 106, the objective worker data is assigned a value assessment and analyzed according to the data group for the injuries of the worker and the objective worker data. Then, in the step 107 any objective data gaps are able to be identified according to an analysis and a comparison based on previous data collected by the HAD and in the step 108, the objective data gaps can be filled so that the data can be assigned a corrected or adjusted RSI.

As stated above, raw subjective worker data and the raw objective worker data are analyzed for completeness to determine any subjective and/or objective data gaps. The HAD can augment the one or more gaps by matching the worker's compensation case with a RSI for a same body part. In some embodiments, a re-analysis can be performed for parity with the HAD augmented data set and as described below, a functional prescription can be provided as a final end product.

In the step 109, the subjective and the objective worker data is analyzed to determine the parity of the ongoing exam. The comparative analysis of the two data sets reveals a relative value of the exam, findings, any deficits and the pathology. If, in the step 109 it is determined that parity is not present, then a subjective and objective data adjustment is performed in the step 111 and the method proceeds to the step 112. The assessment and the relative value of the subjective and objective data is enabled by the comparison to the HAD. A source of non-agreement between the subjective and objective data can also be identified in the step 111. Use of the impairment ARSs can interpolate a final WPI that can be an average of the subjective and the objective portions of the exam.

If parity is present in the step 109, then a subjective and objective data correction is not necessary and the method proceeds to the step 112. In the step 112, an analysis of the subjective and objective data is done with use of the HAD to yield a rating of the validity of the final impairment rating and an injury profile report is created. As described above, after the WPI is calculated it can be used to further analyze the injur(ies) of the worker using one or more work ARSs for creating the functional limitations for the defined and/or anticipated work function of the injured worker. The ARSs can consider the type of work that is being performed and the physical elements of the work to guide the clinical and evaluations to create the functional limitations for the worker.

The injury report as output in step 112, may or may not be directed to WPI. Where it is not, the output at step 112 provides a work prescription to a work at any time and the ability of the worker to return to work based on the present symptoms and at that snapshot in time. Where the injury report is directed to a WPI, the HAD can analyze the WPI to match the RSI class for the injured worker and for the functional status for the class of the worker.

A parity for the class and the injured worker can be used where the worker has a follow up non-impairment visit, where the RSI for the worker is known and functional measurements and the symptom tolerance for the work activity are not known. The body part and pain values or ADLs are entered and a functional prescription can be provided. In some embodiments, a % WPI can be utilized when no RSI is known. In such case, the % WPI can be matched according to the HAD functional status average to provide a functional recommendation.

As described above, a combination of the functions of the steps 111 and 112 perform a correction to the subjective and the objective data set. Particularly, the method as described above, first guides the development of the subjective and the objective data sets and then compares them to each other. The method identifies differences between the data sets and also compares the data sets to the HAD, such as described above to determine the source of the non-agreement between the subjective and the objective data sets. The method can then further adjust the data gaps as identified in the steps 103 and 107 to output a final rating. The method as performed in the step 111 depends on the source, complexity and amount of the non-agreement of the subjective and the objective data sets.

The level of adjustment to the subjective and the objective data sets to obtain data parity at the steps 103 and 107 is the RSI. The RSI is also part of the output of the injury profile report at the step 112. The RSI is useful to ascertain a source of ambiguity and final quality of the worker assessment.

In some situations, where the data set is incomplete, the HAD can automatically augment and compliment the subjective and objective data sets based on historical data for an injured workers cohort to complete an injury profile report. A data addition from the HAD is also used to determine parity between the subjective and objective data sets and determine a RSI for the subjective and objective data sets which can also be output within the injury profile report. The method ends in the step 113.

Figure 2:
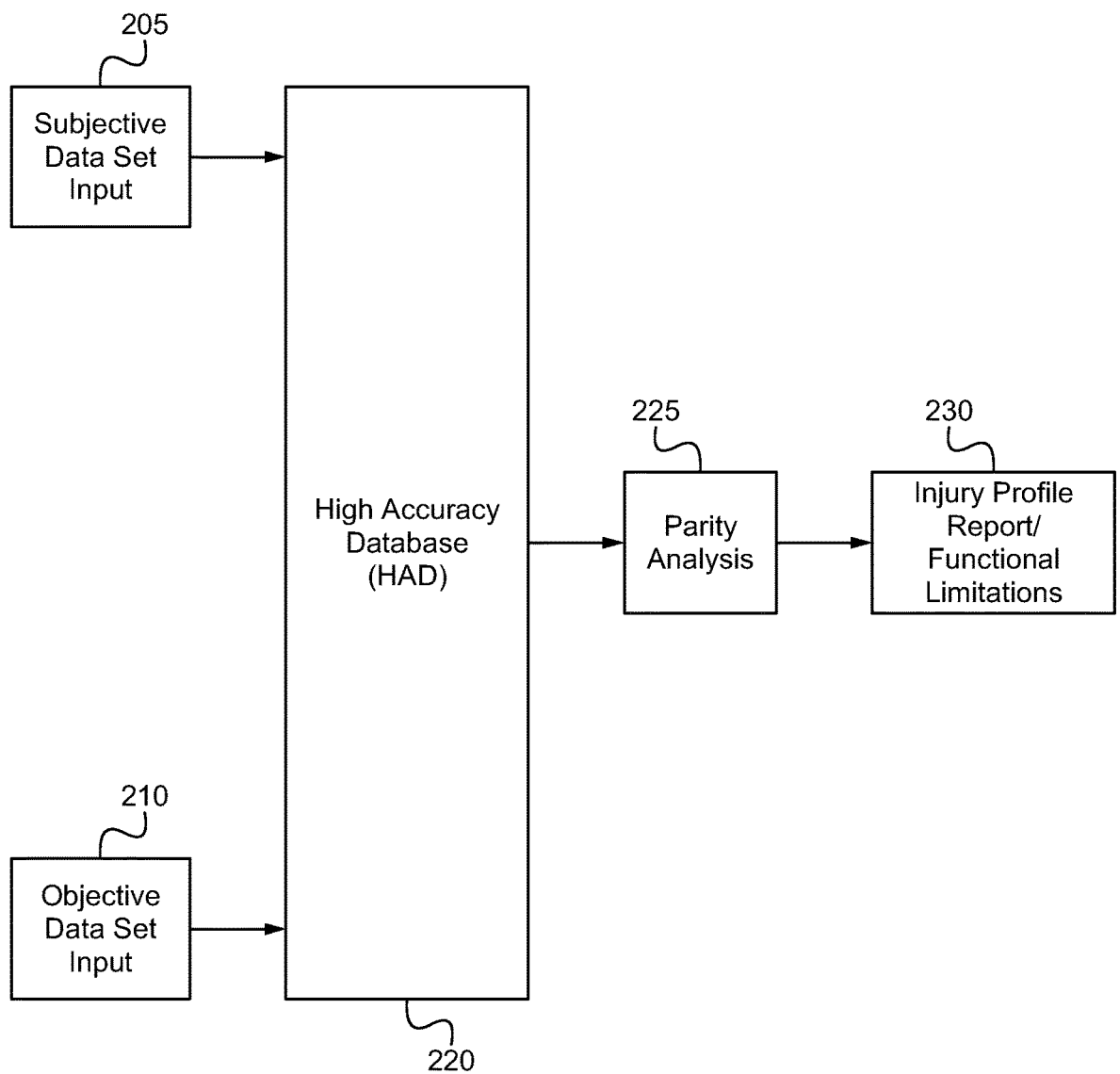
FIG. 2 illustrates system for quantifying a lack of parity for a subjective data set and an objective data set within an injury profile report in accordance with some embodiments.

FIG. 2 illustrates a system for quantifying a lack of parity for a subjective data set and an objective data set within an injury profile report, such as described above. As shown within FIG. 2, the system 200 comprises a subjective data set 205, an objective data set 210 and a HAD 220 configured to receive the subjective data set 205 and the objective data set 210, such as described above. The subjective data set 205 and the objective data set 210 are obtained from one or more tests performed by a clinician on an injured person. In an embodiment, a shell program executing on a clinician computing device controls a graphical user interface, guiding the clinician through data collection and entry process. The shell program encrypts and passes the subjective data set 205 and the objective data set 210 as encrypted data to the HAD 220 for further processing. By facilitating data collection at the client computing device, the shell program enables efficient use and performance of computing resources at the HAD 220.

As shown within FIG. 2, subjective and objective worker data is analyzed to determine the parity of the ongoing exam. In an embodiment, the HAD 220 first decrypts the encrypted data to obtain the subjective data set 205 and the objective data set 210. As described above, the subjective data set 205 and the objective data set 210 are then analyzed at the HAD 220, which is able to augment one or more gaps within the subjective data set 205 and the objective data set 210 and output a parity analysis 225 for the data sets including a percentile rank for the parity of the data sets within the injury cohort or class. In some embodiments, if the parity is below a threshold value, the subjective and objective data sets are further repaired according to a historical accuracy database. Alternatively, if the parity is above the threshold value, an injury profile report including functional return to work limitations is created. As described above, based on the parity of the data sets and as augmented by the HAD, an injury profile report 230 including any functional return to work limitations is then created for the injured worker to guide return to work guidelines. In some embodiments, the subjective and objective data sets are analyzed to assess a source of the lack of non-parity of the data sets.

Figure 3:
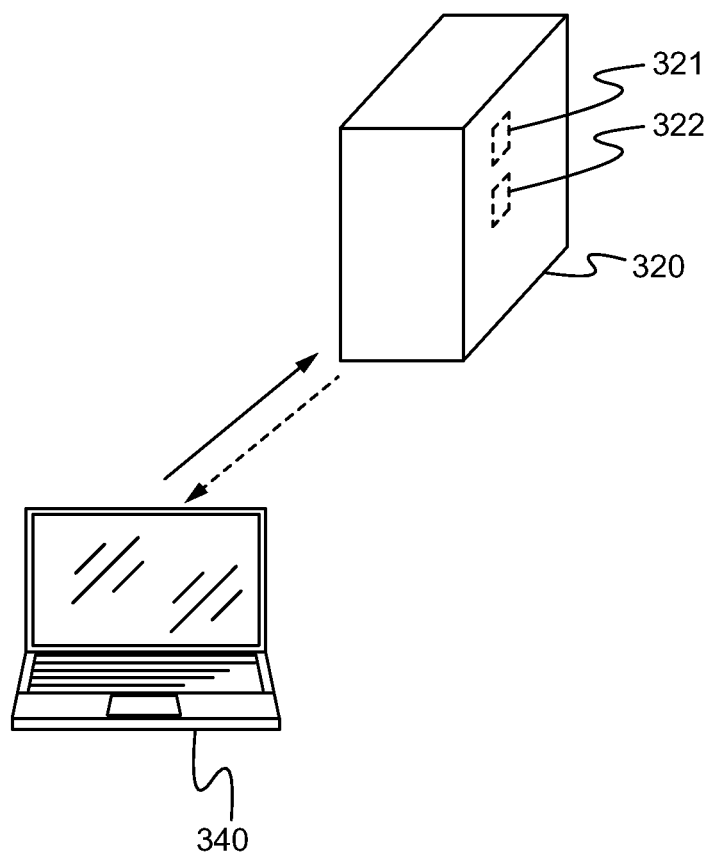
FIG. 3 illustrates a system for quantifying a lack of parity for a subjective data set and an objective data set within an injury profile report in accordance with some embodiments.

FIG. 3 illustrates a system for quantifying a lack of parity for a subjective data set and an objective data set within an injury profile report, such as described above. FIG. 3 illustrates a system for quantifying a lack of parity for a subjective data set and an objective data set within an injury profile report, such as described above. The system 300 comprises a computing device 340 configured for inputting one or more subjective data sets and one or more objective injury data sets, a HAD 320 for receiving the one or more subjective data sets and the one or more objective data sets and a processor 321 at the HAD for processing and analyzing the one or more subjective and objective data sets. In some embodiments, the one or more subjective data sets and objective data sets are automatically uploaded as they are received at the computing device 340.

The HAD 320 receives the data from the computing device 340 and the processor 321 processes and/or analyzes the subjective and objective sets to data set to supplement missing and/or incorrect data and to determine parity between the subjective and the objective data sets. As described above, the data received from the computing device 340 can be automatically compared and augmented according to similar completed data within the HAD 320 according to the injured worker's pathology. An appropriate prioritization of pathologies and apportionments can also identify the data set for completeness. The HAD 320 receives the data from the computing device 340 and analyzes the data set to supplement any missing and/or incorrect data based on the injured worker's pathology to fill in the gaps. The HAD 320 also analyzes and compares the subjective and objective data sets to determine parity. As described above, based on the parity of the data sets and as augmented by the HAD, an injury profile report 230 including any functional return to work limitations is then created for the injured worker to guide return to work guidelines. In some embodiments, if the parity is below a threshold value, the subjective and objective data is further repaired according to a historical accuracy database. Alternatively, if the parity is above the threshold value an injury profile report including functional return to work limitations are created.

In some embodiments, the subjective and objective data sets are analyzed to assess a source of the lack of non-parity of the data sets.

In some embodiments, the subjective and objective injury data is stored within a memory 322 of the HAD and is accessible by the processor 321 for supplementing any missing and/or incorrect data, such as described above. In some embodiments, these data sets can be continuously stored the HAD 320 so that diverse and consistent data is continuously added to the database 320, which is consistently improved through its use.

Particularly, the HAD is able to store a number and amount of complete, scrutinized and correct data sets for the amount of ARSs and injury types that it would be impossible for a person to analyze the amount of data in the HAD in a meaningful time from home. Indeed, if a person or group of people attempted to perform the claimed analysis the injured worker would likely die of old age before a resolution to their claim could occur.

In operation, the method and system as described herein compares one or more subjective injury measurements to one or more objective measurements or physical exam findings to determine whether there is parity with the measurements such that return to work guidelines can be determined for the injured worker. This enables a treating physician to ensure that all subjective and objective exam events have occurred. For example, if there is no parity, it may occur that the treating physician only completed one dimension of three for a subjective history for the injured worker. For example, the treating physician did ask pain level 5/10 but did not ask ADL and pain frequency and only did 1/5 of a range of motion of the required physical exam but did not exam motor, dtr, sensory or other required special testing.

In particular, parity in the medical practice is a data comparison for the structured or objective portion of treatment to the more subjective data obtained from the patient. Lack of agreement or non-parity of the subjective data and the objective data can cause stakeholder confusion, lack of data confidence, and expose additional risk for unnecessary and further injury to the injured worker. The presently claimed invention analyzes and inspects each subjective and objective data set and compares these data sets to the HAD to find a lack of agreement or non-parity of the data sets. The presently claimed invention is able to quantify the lack of parity, provide an injury profile report and proscribe any functional limitations for the injured worker. The output can be used to assign safer and more accurate functional limitations and assign safer and mor accurate functional limitations to support a safer return to work event for the inured worker after injury. As such, the method and system as described herein has many advantages.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention.

We claim:

1. A method comprising: accessing, by a computing device, a storage repository that includes historical cohort data, wherein the historical cohort data includes a plurality of complete data sets of a plurality of previous worker's compensation claims; receiving, by the computing device from a shell program executing on a client computer, encrypted data including clinical data associated with a pending worker's compensation claim for an injured worker, wherein the clinical data includes an initial subjective data set and an initial objective data set that are obtained from one or more tests performed by a clinician on the injured worker, wherein the clinical data is encrypted by the shell program and transmitted to the computing device to improve computing performance at the computing device, wherein the shell program controls a graphical user interface driving a particular data collection sequence by dynamically generating a set of entry fields that is specific to the injured worker, wherein the driving the particular data collection sequence comprises prompting a plurality of adaptively generated entry fields each based on input in a previous entry field; decrypting, by the computing device, the encrypted data to obtain the clinical data; generating, by the computing device, a repaired subjective data set and a repaired objective data set from the initial subjective data set and the initial objective data set respectively based on at least a portion of historical cohort data; comparing, by the computing device, the repaired subjective data set to the repaired objective data set to determine whether there is a parity for the repaired subjective data set and the repaired objective data set, and when the parity is below a threshold value, correcting, by the computing device, the repaired subjective data set and objective data set according to a historical accuracy database; determining, by the computing device, a level of adjustment corresponding with an amount of adjustments applied to the initial subjective data set and the initial objective data set to obtain the parity;

determining a recovery score index based on at least the repaired objective data set; accessing a completed digital functional task form including work activities and associated values that are unique for the injured worker; parsing the completed digital functional task form to identify the activities and associated values included in the completed functional task form; and using the associated values and the recovery score index to provide functional limitation recommendations for the work activities for returning to work.

2. The method of claim 1, wherein the initial subjective data set and the initial objective data set are repaired by comparison to the historical accuracy database.

3. The method of claim 1, wherein the parity for the repaired subjective and objective data sets is compared against historical parity for similar subjective and objective data sets for an injury.

4. The method of claim 1, further comprising analyzing, by the computing device, the initial subjective data set and the initial objective data set to the portion of historical cohort data to determine one or more data gaps in the initial subjective data set and the initial objective data set, wherein the repaired subjective data set and the repaired objective data set are generated in response to determining the one or more data gaps in the initial subjective data set and the initial objective data set.

5. The method of claim 1, further comprising, based on the comparison, determining, by the computing device, functional limitations of work function of the injured worker, according to a plurality of administrative rule sets.

6. The method of claim 1, further comprising, based on the comparison, generating, by the computing device, an injury profile report including the level of adjustment.

7. A system comprising: a storage repository that includes historical cohort data, wherein the historical cohort data includes a plurality of complete data sets of a plurality of previous worker's compensation claims; a computing device communicatively coupled with the storage repository and configured to: receiving, by the computing device from a shell program executing on a client computer, encrypted data including clinical data associated with a pending worker's compensation claim for an injured worker, wherein the clinical data includes an initial subjective data set and an initial objective data set that are obtained from one or more tests performed by a clinician on the injured worker, wherein the clinical data is encrypted by the shell program and transmitted to the computing device to improve computing performance at the computing device, wherein the shell program controls a graphical user interface driving a particular data collection sequence by dynamically generating a set of entry fields that is specific to the injured worker, wherein the driving the particular data collection sequence comprises prompting a plurality of adaptively generated entry fields each based on input in a previous entry field; decrypting, by the computing device, the encrypted data to obtain the clinical data; generate a repaired subjective data set and a repaired objective data set from the initial subjective data set and the initial objective data set respectively based on at least a portion of historical cohort data; compare the repaired subjective data set to the repaired objective data set to determine whether there is a parity for the repaired subjective data set and the repaired objective data set, and when the parity is below a threshold value, correct the repaired subjective data set and objective data set according to a historical accuracy database; determine a level of adjustment corresponding with an amount of adjustments applied to the initial subjective data set and the initial objective data set to obtain the parity; determining a recovery score index based on at least the repaired objective data set; accessing a completed digital functional task form including work activities and associated values that are unique for the injured worker; parsing the completed digital functional task form to identify the activities and associated values included in the completed functional task form; and using the associated values and the recovery score index to provide functional limitation recommendations for the work activities for returning to work.

8. The system of claim 7, wherein the initial subjective data set and the initial objective data set are repaired by comparison to the historical accuracy database.

9. The system of claim 7, wherein the parity for the repaired subjective and objective data sets is compared against historical parity for similar subjective and objective data sets for an injury.

10. The system of claim 7, wherein the computing device is further configured to analyze the initial subjective data set and the initial objective data set to the portion of historical cohort data to determine one or more data gaps in the initial subjective data set and the initial objective data set, wherein the repaired subjective data set and the repaired objective data set are generated in response to determining the one or more data gaps in the initial subjective data set and the initial objective data set.

11. The system of claim 7, wherein the computing device is further configured to, based on the comparison, determine functional limitations of work function of the injured worker, according to a plurality of administrative rule sets.

12. The system of claim 7, wherein the historical cohort data is updated using the pending worker's compensation claim.

13. One or more non-transitory computer-readable storage media storing one or more instructions when executed by one or more computing devices cause: accessing, by a computing device, a storage repository that includes historical cohort data, wherein the historical cohort data includes a plurality of complete data sets of a plurality of previous worker's compensation claims; receiving, by the computing device from a shell program executing on a client computer, encrypted data including clinical data associated with a pending worker's compensation claim for an injured worker, wherein the clinical data includes an initial subjective data set and an initial objective data set that are obtained from one or more tests performed by a clinician on the injured worker, wherein the clinical data is encrypted by the shell program and transmitted to the computing device to improve computing performance at the computing device, wherein the shell program controls a graphical user interface driving a particular data collection sequence by dynamically generating a set of entry fields that is specific to the injured worker, wherein the driving the particular data collection sequence comprises prompting a plurality of adaptively generated entry fields each based on input in a previous entry field; decrypting, by the computing device, the encrypted data to obtain the clinical data; generating, by the computing device, a repaired subjective data set and a repaired objective data set from the initial subjective data set and the initial objective data set respectively based on at least a portion of historical cohort data; comparing, by the computing device, the repaired subjective data set to the repaired objective data set to determine whether there is a parity for the repaired subjective data set and the repaired objective data set, and when the parity is below a threshold value, correcting, by the computing device, the repaired subjective data set and objective data set according to a historical accuracy database; determining, by the computing device, a level of adjustment corresponding with an amount of adjustments applied to the initial subjective data set and the initial objective data set to obtain the parity;

determining a recovery score index based on at least the repaired objective data set; accessing a completed digital functional task form including work activities and associated values that are unique for the injured worker; parsing the completed digital functional task form to identify the activities and associated values included in the completed functional task form; and using the associated values and the recovery score index to provide functional limitation recommendations for the work activities for returning to work.

14. The one or more non-transitory computer-readable storage media of claim 13, wherein the initial subjective data set and the initial objective data set are repaired by comparison to the historical accuracy database.

15. The one or more non-transitory computer-readable storage media of claim 13, wherein the parity for the repaired subjective and objective data sets is compared against historical parity for similar subjective and objective data sets for an injury.

16. The one or more non-transitory computer-readable storage media of claim 13, wherein the one or more instructions when executed by the one or more computing devices further cause analyzing, by the computing device, the initial subjective data set and the initial objective data set to the portion of historical cohort data to determine one or more data gaps in the initial subjective data set and the initial objective data set, wherein the repaired subjective data set and the repaired objective data set are generated in response to determining the one or more data gaps in the initial subjective data set and the initial objective data set.

17. The one or more non-transitory computer-readable storage media of claim 13, wherein the one or more instructions when executed by the one or more computing devices further cause, based on the comparison, determining, by the computing device, functional limitations of work function of the injured worker, according to a plurality of administrative rule sets.

* * * * *